(12) United States Patent
Mironov

(10) Patent No.: US 9,061,447 B2
(45) Date of Patent: Jun. 23, 2015

(54) COMPOSITE MATERIAL MOULD HAVING IMPROVED MOULD SURFACE

(75) Inventor: Gabriel Mironov, Montreal (CA)

(73) Assignee: Suzhou Red Maple Wind Blade Mould Co., Ltd., Jiangsu (CN)

( * ) Notice: Subject to any disclaimer, the term of this patent is extended or adjusted under 35 U.S.C. 154(b) by 216 days.

(21) Appl. No.: 13/394,949

(22) PCT Filed: Sep. 9, 2010

(86) PCT No.: PCT/CN2010/001385
§ 371 (c)(1),
(2), (4) Date: Apr. 30, 2012

(87) PCT Pub. No.: WO2011/029275
PCT Pub. Date: Mar. 17, 2011

(65) Prior Publication Data
US 2012/0205052 A1 Aug. 16, 2012

(30) Foreign Application Priority Data

Sep. 11, 2009 (CN) .......................... 2009 1 0169176

(51) Int. Cl.
| | |
|---|---|
| *B29C 33/38* | (2006.01) |
| *B32B 5/08* | (2006.01) |
| *B32B 5/26* | (2006.01) |
| *B32B 9/00* | (2006.01) |
| *B32B 17/02* | (2006.01) |
| *B32B 17/06* | (2006.01) |
| *B29C 33/40* | (2006.01) |

(Continued)

(52) U.S. Cl.
CPC ............... *B29C 33/38* (2013.01); *Y10T 428/27* (2015.01); *Y10T 428/26* (2015.01); *B29C 33/40* (2013.01); *B29C 33/56* (2013.01); *B29K 2707/04* (2013.01); *B29K 2709/08* (2013.01); *B29L 2031/7498* (2013.01); *B32B 5/08* (2013.01); *B32B 5/26* (2013.01); *B32B 9/00* (2013.01); *B32B 17/02* (2013.01); *B32B 17/067* (2013.01)

(58) Field of Classification Search
CPC .......... B29C 33/38; B32B 5/00; B32B 27/38; B32B 27/36; B32B 17/10
USPC ................. 156/500, 280, 60; 428/317.9, 426; 442/320
See application file for complete search history.

(56) References Cited

U.S. PATENT DOCUMENTS

| | | | | |
|---|---|---|---|---|
| 4,486,490 A | * | 12/1984 | Patz et al. ..................... | 442/219 |
| 4,851,280 A | | 7/1989 | Gupta | |

(Continued)

FOREIGN PATENT DOCUMENTS

| | | |
|---|---|---|
| CN | 2778524 Y | 5/2006 |
| CN | 101258012 A | 9/2008 |
| JP | H0615660 A | 1/1994 |
| JP | H664822 | 9/1994 |

(Continued)

OTHER PUBLICATIONS

Dec. 16, 2010 International Search Report in Application No. PCT/CN2010/001385.

(Continued)

*Primary Examiner* — Jacob Thomas Minskey
(74) *Attorney, Agent, or Firm* — Novak Druce Connolly Bove + Quigg LLP

(57) ABSTRACT

A composite mold laminate, having a main structure layer made of oriented fiberglass, characterized in that the laminate further comprises a surface layer comprising random oriented carbon fiber.

15 Claims, 1 Drawing Sheet

(51) Int. Cl.
 B29C 33/56 (2006.01)
 B29K 707/04 (2006.01)
 B29K 709/08 (2006.01)
 B29L 31/00 (2006.01)

(56) References Cited

U.S. PATENT DOCUMENTS

| | | | |
|---|---|---|---|
| 5,149,583 | A | 9/1992 | Saarikettu |
| 7,972,548 | B2 | 7/2011 | Callis |
| 2007/0012858 | A1* | 1/2007 | Callis .......................... 249/134 |
| 2009/0252916 | A1* | 10/2009 | Heidrich et al. ................ 428/86 |

FOREIGN PATENT DOCUMENTS

| | | |
|---|---|---|
| KR | 10-1991-0004236 B1 | 6/1991 |
| KR | 1019910004236 B1 | 6/1991 |
| WO | 2008/007094 A2 | 1/2008 |

OTHER PUBLICATIONS

Chinese Office Action dated Jan. 23, 2014, issued in corresponding Chinese Application No. 200910169176.9.
Office Action dated Aug. 14, 2014 from corresponding Korean Application No. 20-2010-0009501 with English translation.
Office Action dated Feb. 27, 2015 from corresponding Korean Utility Model Application No. 20-2010-0009501 with English translation.

* cited by examiner

COMPOSITE MATERIAL MOULD HAVING IMPROVED MOULD SURFACE

TECHNICAL FIELD OF THE INVENTION

The present invention relates to a structure for a mould composed of a fibre-reinforced resin matrix composite material, in particular such a mould adapted to produce large structures such as wind turbine blades.

BACKGROUND OF THE INVENTION

Large moulds composed of composite material, in particular fibre-reinforced resin matrix composite material, especially those used for producing wind turbine blades, are well known in the art.

The vast majority of such moulds are produced from epoxy-fiberglass laminate, or polyester-fiberglass laminate, both of which are excellent electrical conductors. Under conditions of low atmospheric humidity however, such moulds, especially large ones such as those used for making wind turbine blades, can build up strong static electric charges. These static electrical charges mainly develop whenever the finished parts are demoulded and removed from the mould. Such static electricity can cause several problems:
1. Static charges can damage electronic equipment, such as mould heating control systems.
2. Static discharge can ignite explosive vapors.
3. Static discharge is unpleasant for workers who may touch the mould.

An additional shortcoming of the traditional composite moulding tools is the use of gelcoat as a surface layer. This gelcoat surface layer is easily cracked or debonded, since it consists of only resin with small particulate filler, and does not have any reinforcing fiber content.

This gelcoat layer has traditionally been required because epoxy-fiberglass or polyester-fiberglass mould laminate cannot obtain a satisfactory surface finish after repairing and sanding. Due to the difference in hardness between the resin and the glass, the glass fibers always emerge above the resin after sanding, resulting in a rough and unsatisfactory surface finish. Only by making the surface totally from gelcoat resin can a repairable mould be obtained.

SUMMARY OF THE INVENTION

An aim of the present invention is to overcome these problems with known moulds.

Accordingly, the present invention provides a composite mould laminate, having a main structure layer made of oriented fiberglass, characterized in that the laminate further comprises a surface layer comprising random oriented carbon fiber.

Preferably, the surface layer is 0.2-2.0 mm in thickness, optionally 0.3-2.0 mm in thickness. The carbon fiber surface layer is typically formed from a carbon fiber felt. The carbon fiber of the front surface layer preferably has an area weight of 50-200 g/m2, optionally 50-150 g/m2. The surface layer may be shaped to provide the front moulding surface of the mould laminate.

Preferably, the fiberglass forms a structural layer of the mould laminate beneath the surface layer, the structural layer comprising oriented fiberglass. Optionally, the structural layer is multiaxial. Typically, the structural layer is composed of stitched fiberglass cloth having an area weight of 400-2000 g/m2.

Preferably, the laminate may further comprise an intermediate layer between the surface layer and the structural layer, the intermediate layer being composed of one or more layers of biaxial glass cloth, chopped strand mat, or other types of glass cloth, and having with an area weight of 50-1000 g/m2. Typically, the intermediate layer is adapted to prevent marking or print-through on a moulding surface of the surface resin caused by resin shrinkage.

Preferably, each of the fiber-containing layers of the laminate further comprises a common resin matrix in which the fibers are disposed. Most preferably, the common resin matrix is produced by vacuum resin infusion. The resin typically comprises an epoxy resin, a polyester resin, or a vinylester resin. Optionally, the resin contains carbon particles to improve the electrical conductivity of the surface of the mould laminate.

The laminate may further comprise conductive metal strips disposed at various points along the mould laminate and extending through the mould laminate to electrically connect layers of the laminate to provide an earthing for the surface layer.

The present invention also provides a mould made from the laminate of the present invention.

The preferred embodiments of the present invention therefore relate to a structure for composite moulds, which provides a fiberglass mould with a surface that is electrically conductive, strong, and attractive in appearance. The moulds of the preferred embodiments are, in particular, large moulds composed of composite material, in particular fibre-reinforced resin matrix composite material, especially those used for producing wind turbine blades.

The preferred embodiments of the present invention can provide a low cost and practical way of dissipating the static charge effectively, without major modification to the epoxy-fiberglass or polyester-fiberglass mould structure.

By means of the preferred embodiments of the present invention, the gelcoat layer may also be eliminated. The carbon fibers and mould resin may be sufficiently similar in hardness so that a smooth and beautiful surface may be obtained after repairing and sanding. The carbon fiber reinforced mould surface is stronger and more resistant to cracking than gelcoat surfaces currently used in the art.

An additional benefit of the preferred embodiments of the present invention is an improved thermal conductivity of the mould surface. The carbon fiber laminate layer has a transverse thermal conductivity more than 10× higher than the glass fiber laminate, and this can help to equalize the temperature on the surface of a heated mould or prevent local overheating.

BRIEF DESCRIPTION OF THE DRAWINGS

The present invention will now be described in detail by way of a non-limiting example and with reference to the accompanying drawings, wherein.

DETAILED DESCRIPTION OF PREFERRED EMBODIMENTS

Figure 1:
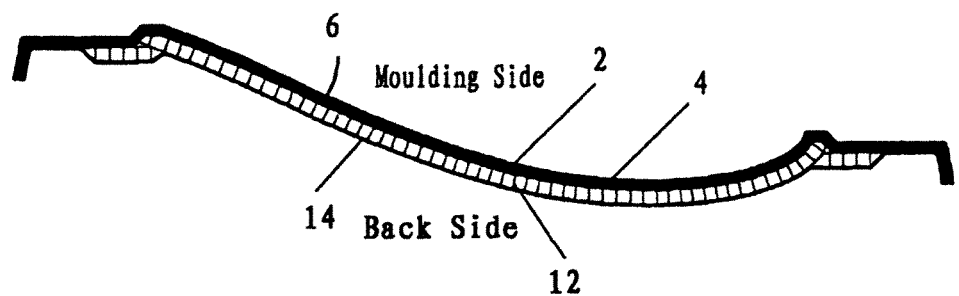
FIG. 1 is a cross-section through a mould laminate of fiber-reinforced resin matrix composite material in accordance with one preferred embodiment of the present invention.
Figure 2:
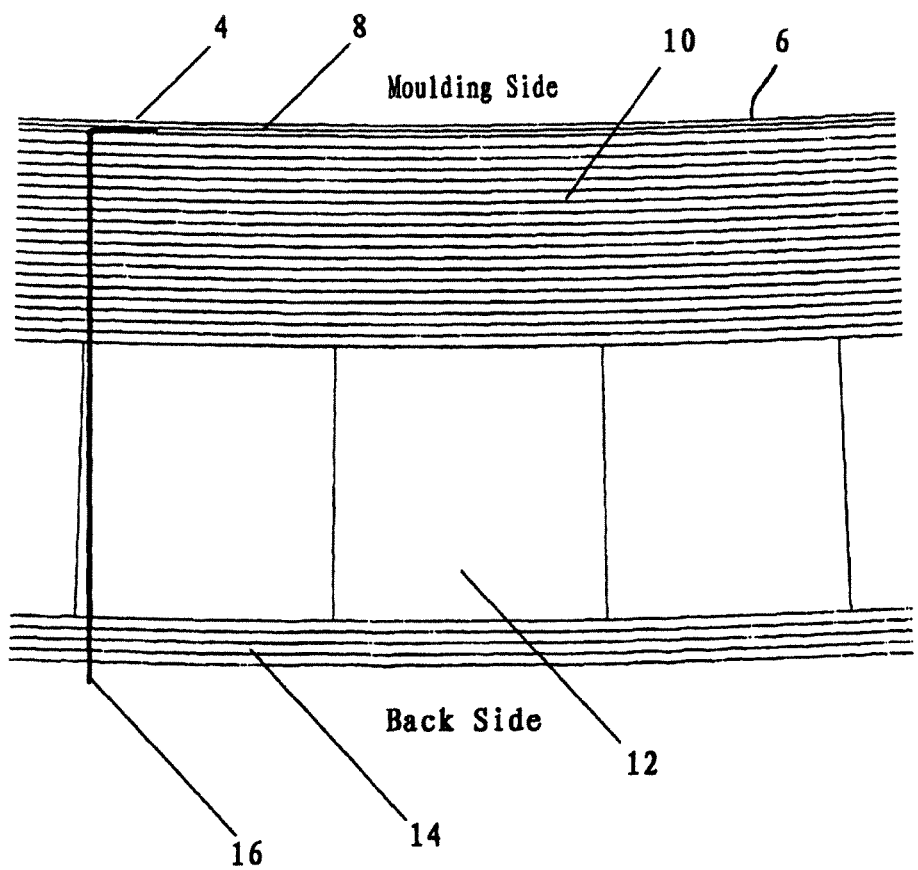
FIG. 2 is an enlarged cross-section through part of the mould laminate of FIG. 1.

A preferred embodiment of the present invention will now be described by way of example only with reference to FIGS.

1 and 2 of the drawings, which illustrate a mould composed of a mould laminate 2 of fiber-reinforced resin matrix composite material. The mould most preferably comprises as a wind turbine blade mould.

The mould laminate 2 comprises a thin front surface layer 4 comprising random oriented carbon fiber. Typically, the front surface layer 4 is 0.2-2.0 mm in thickness, optionally 0.3-2.0 mm in thickness. The front surface layer 4 is shaped to provide the moulding surface 6 of the mould laminate 2. The carbon fiber of the front surface layer 4 is typically formed from a carbon fiber felt, preferably having an area weight of 50-200 g/m2, optionally 50-150 g/m2. One or more layers may be used to reach such an area weight, as typical commercially-available felts have an area weight of 50 or 100 g/m2. Thicker carbon layers increase the manufacturing cost but allow for more repairing and sanding of the front surface layer 4 during use of the mould laminate 2.

An intermediate layer 8, typically composed of one or more layers of biaxial glass cloth, chopped strand mat, or other types of glass cloth, and typically with an area weight from 50-1000 g/m2, is preferably provided beneath the front surface layer 4. The intermediate layer 8 may be used to help prevent marking or 'print-through' on the moulding surface 6 caused by resin shrinkage. The intermediate layer 8, in particular, preferably comprises 1-2 layers of chopped strand mat, each layer having an area weight of 200-300 g/m2, followed by 1-2 layers of biaxial stitched glass each 400-1000 g/m2 in weight. Such a laminate may for example be composed of, using common terms used in the composite material art and industry, terms as 2×CMS225 followed by 1×BX1000.

A main structural layer 10, which acts as a backing for the surface layer 4, comprising oriented fiberglass is adjacent to and underneath the front surface layer 4, or the intermediate layer 8 when present. Preferably, the fiberglass of the structural layer 10 is multiaxial and has been formed into mats by a multiaxial stitching process. The structural layer 10 is relatively thick compared to the front surface layer 4 and the intermediate layer 8. The structural layer 10 forms the main mass of the mould structure, and is typically composed of stitched fiberglass cloth 400-2000 g/m2 in area weight. Most suitable is fiberglass material which is able to be easily infused with resin in a vacuum resin infusion process, for example 1000 g/m2 biaxial stitched glass known in the industry as LT1000.

Optionally, a sandwich core layer 12 is adjacent to the structural layer 8. Furthermore, optionally there is a rear layer 14 comprising fiberglass.

The electrically conductive front surface layer 4 and rear layer 14 are suitably connected to electrical earthing using conductive metal mesh strips 16 at various points along the mould laminate 2. Typically, aluminium mesh is used to form the earthing strips 16. Alternatively, conductive metal wires may be used. The earthing strips 16 extend rearwardly from the surface layer 4, with which they are in electrical connection, and with the earthing strips 16 being located beneath the front moulding surface 6, so as to project from the rear surface of the mould so that the earthing strips 16 can be connected to earth potential.

Each of the fiber layers, namely the surface layer 4, the intermediate layer 8 and the structural layer 10 comprises a common resin matrix in which the fibers are disposed. Most preferably, the resin matrix for all of these fiber layers has been formed in a single vacuum resin infusion process, i.e. at one time. The resin may be epoxy based, polyester based, or vinylester based. Most preferably, the resin matrix is composed of an epoxy resin containing carbon black pigment, comprising carbon filler particles, which renders the resin also mildly electrically conductive.

It is highly preferable to include the interface layer 8 between the carbon fiber surface layer 4 and the structural layer 10 in order to reduce shrinkage marks on the mould surface 6, but the interface layer 8 is not essential.

In a preferred embodiment of the present invention a mould, such as a wind turbine blade mould, may be made as follows: the front surface layer 4, optional intermediate layer 8, and structural layer 10 are laid up to form a stack; the optional sandwich core layer 12 and rear layer 14 are assembled adjacent to the stack to form a laminate; when required, wires or conductive metal mesh strips 16 are located at various points along the mould; and then the complete laminate is vacuum infused with a resin, so that the same resin infuses all of the fiber layers in a single step. It is highly preferable to use an infusion resin containing carbon filler to improve the electrical conductivity of the mould surface, but this is not essential. Preferably, the resin is an epoxy resin containing carbon black pigment. The resin is then cured, as is well known to those skilled in the art, to form the final mould laminate.

Various other embodiments and modifications of the present invention will readily be apparent to those skilled in the art. A person skilled in the art can contemplate many modifications within the scope of the present invention. These modifications all fall in the scope of the present invention as defined by the attached claims.

What is claimed is:

1. A composite mould laminate comprising:
    a main structural layer made of oriented fiberglass;
    a surface layer comprising random oriented carbon fiber;
        wherein the carbon fiber of the surface layer is formed from a carbon fiber felt having an area weight of 50-150 g/m2 in which the carbon fibers are randomly oriented; and where the surface layer further includes a resin containing carbon filler particles to provide electrical conductivity to the surface layer of the mould laminate; and
    a plurality of conductive metal strips disposed at various points along the mould laminate and extending through the mould laminate to electrically connect layers of the laminate to provide an earthing for the surface layer.

2. The laminate of claim 1, wherein the surface layer is from 0.2-2.0 mm in thickness.

3. The laminate of claim 1, wherein the surface layer is shaped to provide the front moulding surface of the mould laminate.

4. The laminate of claim 1, wherein the fiberglass forms a structural layer of the mould laminate beneath the surface layer, the structural layer comprising oriented fiberglass.

5. The laminate of claim 4, wherein the structural layer is multiaxial.

6. The laminate of claim 4, wherein the structural layer is composed of stitched fiberglass cloth having an area weight of 400-2000 g/m2.

7. The laminate of claim 4, further comprising an intermediate layer between the surface layer and the structural layer, the intermediate layer being composed of one or more layers of biaxial glass cloth, chopped strand mat, or other types of glass cloth, and having with an area weight of 50-1000 g/m2.

8. The laminate of claim 7, wherein the intermediate layer is adapted to prevent marking or print-through on a moulding surface of the surface resin caused by resin shrinkage.

9. The laminate of claim 1, wherein each of the fiber-containing layers of the laminate further comprises a common resin matrix in which the fibers are disposed.

10. The laminate of claim 9, wherein the common resin matrix is produced by vacuum resin infusion.

11. The laminate of claim 9, wherein the resin comprises an epoxy resin, a polyester resin, or a vinylester resin.

12. The laminate of claim 1, wherein the conductive metal strips are composed of aluminium mesh.

13. The laminate of claim 1, wherein the surface layer is from 0.3-2.0 mm in thickness.

14. A mould made from the laminate of claim 1, wherein the surface layer forms a front moulding surface of the mould.

15. The mould of claim 14 which is a wind turbine blade mould.

\* \* \* \* \*

UNITED STATES PATENT AND TRADEMARK OFFICE
CERTIFICATE OF CORRECTION

PATENT NO. : 9,061,447 B2
APPLICATION NO. : 13/394949
DATED : June 23, 2015
INVENTOR(S) : Gabriel Mironov Page 1 of 1

It is certified that error appears in the above-identified patent and that said Letters Patent is hereby corrected as shown below:

In the claims,

In column 4, line 61 (claim 7) delete "with"

Signed and Sealed this
Ninth Day of February, 2016

Michelle K. Lee
*Director of the United States Patent and Trademark Office*